(12) United States Patent
Howard et al.

(10) Patent No.: US 8,278,945 B2
(45) Date of Patent: Oct. 2, 2012

(54) INDUCTIVE POSITION DETECTOR

(76) Inventors: Mark Anthony Howard, Worlington Suffolk (GB); Darran Kreit, Cambridge (GB)

( * ) Notice: Subject to any disclaimer, the term of this patent is extended or adjusted under 35 U.S.C. 154(b) by 246 days.

(21) Appl. No.: 12/739,949

(22) PCT Filed: Oct. 24, 2008

(86) PCT No.: PCT/GB2008/050990
§ 371 (c)(1),
(2), (4) Date: Jul. 26, 2010

(87) PCT Pub. No.: WO2009/053752
PCT Pub. Date: Apr. 30, 2009

(65) Prior Publication Data
US 2011/0025349 A1 Feb. 3, 2011

(30) Foreign Application Priority Data

Oct. 24, 2007 (GB) .................................. 0720949.7
Nov. 8, 2007 (GB) .................................. 0721897.7
Feb. 19, 2008 (GB) .................................. 0802947.2
Jul. 15, 2008 (GB) .................................. 0812870.4

(51) Int. Cl.
*G01R 27/28* (2006.01)
*G01L 3/00* (2006.01)
(52) U.S. Cl. ..................... 324/655; 324/654; 73/862.331

(58) Field of Classification Search ............... 324/655, 324/654, 649, 600; 73/1.79, 314, 114.26, 73/114.28, 114.36, 862.331; 702/94, 95, 702/150, 151, 152; 340/995.28
See application file for complete search history.

(56) References Cited

U.S. PATENT DOCUMENTS

| | | | |
|---|---|---|---|
| 6,995,573 B2 * | 2/2006 | Becker et al. | 324/655 |
| 7,205,775 B2 * | 4/2007 | Kreit | 324/654 |
| 8,020,453 B2 * | 9/2011 | Kreit et al. | 73/862.331 |
| 2009/0261844 A1 * | 10/2009 | Howard et al. | 324/655 |
| 2010/0001718 A1 * | 1/2010 | Howard et al. | 324/207.15 |

FOREIGN PATENT DOCUMENTS

| | | |
|---|---|---|
| GB | 2427481 | 11/2007 |
| WO | WO0229443 | 4/2002 |
| WO | WO2006067420 | 6/2006 |

* cited by examiner

*Primary Examiner* — Hoai-An D Nguyen
(74) *Attorney, Agent, or Firm* — Thorpe North & Western LLP (57) ABSTRACT

An inductive detector arranged to measure position along a axis comprising: a transmit winding; a receive winding; a passive circuit comprising a winding in electrical series with a capacitor; wherein: the mutual inductance between the transmit winding and the receive winding is a function of the relative displacement of the passive circuit along the measurement axis; a first portion of one of the windings is wound on a first pitch and a second portion of the same winding is wound on a second pitch whose extent is greater than the first pitch.

18 Claims, 6 Drawing Sheets

INDUCTIVE POSITION DETECTOR

FIELD OF THE INVENTION

This invention relates to an inductive detector, operable to measure the position of relatively moveable bodies.

REVIEW OF THE PRIOR ART KNOWN TO THE APPLICANT

The authors have previously disclosed several inventions relating to inductive position detectors. GB2427481 describes a detector in which the mutual inductance between transmit and receive windings is a function of the position of a passive, resonant target along a measurement axis. To provide high resolution measurement, the target uses multiple windings which are arranged either in a coarse and fine or Vernier pair patterns. Such arrangements typically require the coarse and fine or Vernier pair windings to be spatially separated across the measurement axis with corresponding antenna windings. Alternatively, the windings are arranged on separate layers normal to the measurement axis. Typically, each of the targets has its own resonant frequency. Many applications have tight space constraints which cause the various windings to be arranged closely together. If the windings are reduced in size to fit tight space constraints then the target has to be arranged more closely to the antenna and good linearity is more difficult to achieve. Windings which are closely grouped also results in interaction or cross-talk and hence a reduction in measurement performance. Further, multiple targets and hence frequencies increases the complexity and cost of the detector's electronic circuit.

The object of the present invention is to provide a compact detector which measures position precisely in a variety of topologies with low production cost. The invention has particular utility in high precision rotary and linear detectors.

SUMMARY OF THE INVENTION

The present invention provides an inductive position detector according to claim 1. Particular features of embodiments of the invention are defined in the dependent claims.

In general terms, the invention provides an inductive detector to measure position along an axis comprising: a transmit winding; a receive winding; a passive circuit comprising a winding in electrical series with a capacitor; wherein: the mutual inductance between the transmit winding and the receive winding is a function of the relative displacement of the passive circuit along the measurement axis; a first portion of one of the windings is wound on a first pitch and a second portion of the same winding is wound on a second pitch whose extent is greater than the first pitch.

BRIEF DESCRIPTION OF THE DRAWINGS

In the accompanying drawings.

DESCRIPTION OF A PREFERRED EMBODIMENT

Figure 1:
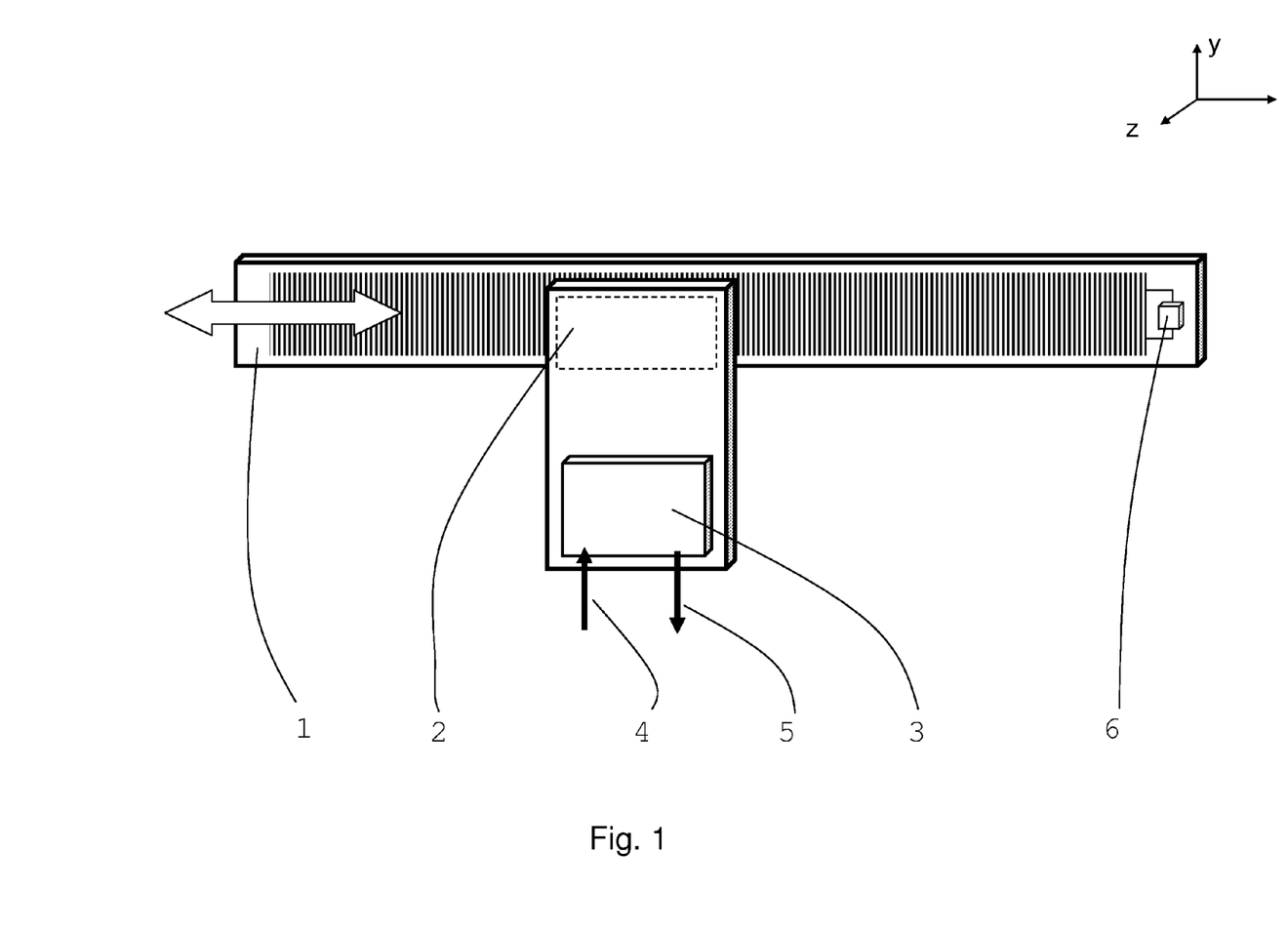
FIG. 1 shows a simplified, linear form of the detector.
Figure 2:
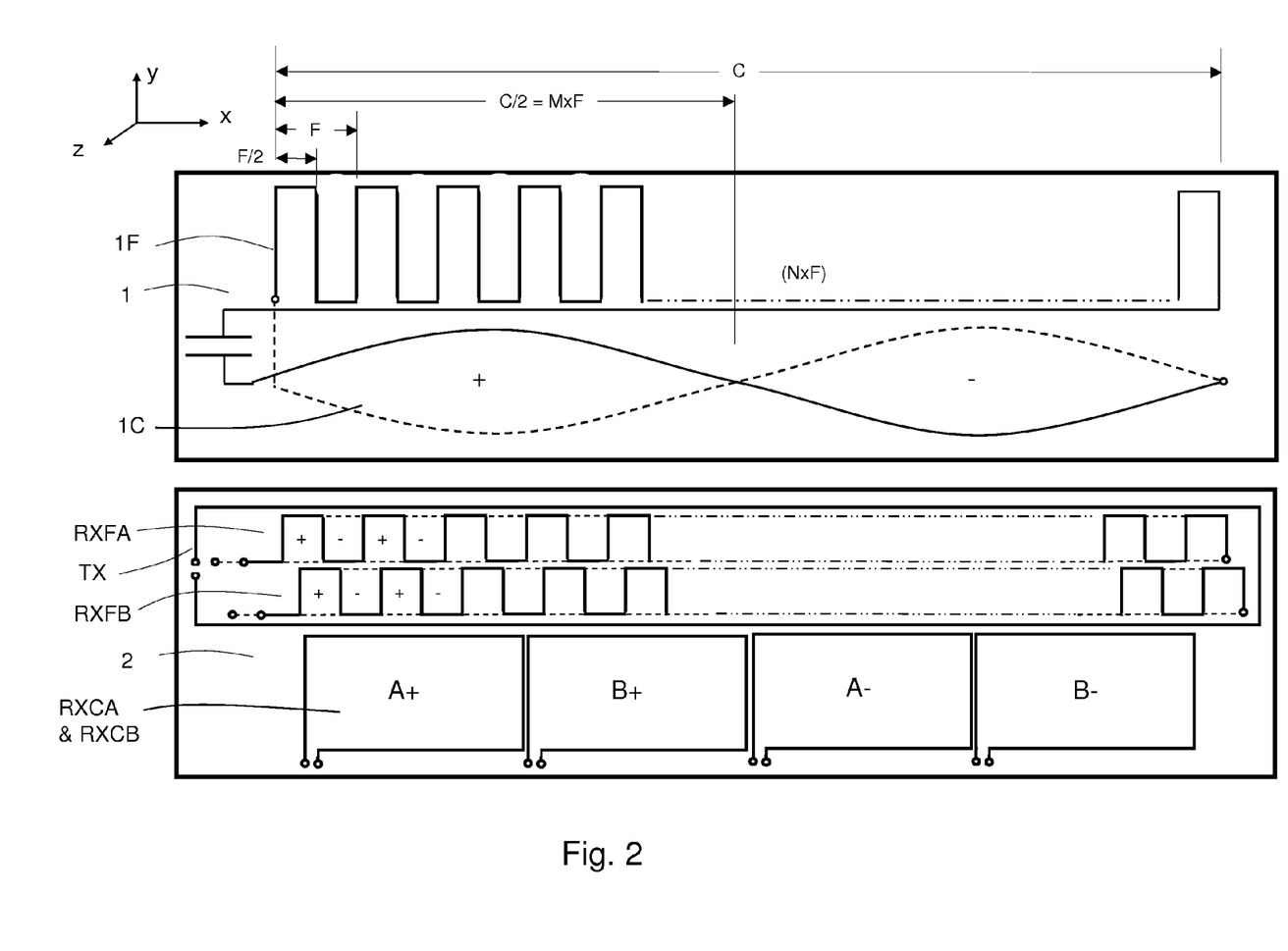
FIG. 2 shows a schematic arrangement of the windings in a first embodiment.

FIG. 1 shows a simplified schematic of the invention as a linear detector. A passive, substantially laminar inductive target [1] is arranged opposite a substantially laminar antenna [2]. The target [1] and antenna [2] are used to detect the relative displacement of the bodies which they are attached to. The bodies are arranged to move principally in a single linear axis [x]. The antenna [2] and target [1] are made from printed circuit board (PCB). The antenna [2] contains a transmit winding [TX] and receive windings [RXFA, RXFB, RXCA, RXCB] as shown in FIG. 2. The target [1] is a passive resonant circuit which comprises an inductor, formed by a laminar winding, and a capacitor [6] in electrical series. The target's winding has 2 portions—a first, fine pitch portion [1F] and a second, coarse pitch portion [1C]. Preferably, the passive circuit's resonant frequency is in the range 100 kHz-10 MHz. The antenna's transmit winding [TX] is energised with an AC signal from the electronics circuit [3] at substantially the same frequency as the resonant frequency of the target [1]. The transmit winding [TX] creates a local electromagnetic field which induces currents in the target's [1] circuit. The target [1] and antenna [2] are arranged such that the mutual inductance between the transmit winding [TX] and receive windings [RFA, RFB, RCA, RCB] is a function of the relative displacement of the target [1] and antenna [2] along the measurement axis. The electronics circuit [3] is energised by an electrical power supply [4] and outputs an electrical signal [5] according to the relative position of the target [1] and antenna [2].

FIG. 2 shows a schematic of the target [1] and antenna [2] windings which are shown out of position for clarity. In operation, the windings of the target which are shown uppermost co-operate with the windings of the antenna shown uppermost etc. The target's winding is in 2 portions—a fine pitch portion [1F] and a coarse pitch portion [1C]. The antenna comprises a transmit winding [TX], a first fine pitch receive winding [RXFA], a second fine pitch receive winding [RXFB] and coarse pitch receive windings [RXCA, & RXCB]. The antenna's fine pitch windings are shifted relative to each other along the measurement axis by ¼ of their winding pitch [F] to effectively form a sinusoidal and cosinusoidal winding. Preferably, the transmit [TX] and receive windings are electrically balanced so that when the target [1] is absent there is very little or no inductive coupling between them. The target's winding is shaped in 2 portions so that the mutual inductance between the transmit [TX] and the receive windings is a function of the displacement of target [1] relative to the antenna [2] along the measurement axis [x]. This function comprises an unambiguous element from the interaction of the coarse windings [1C and RXCA & RXCB] and a repetitive element from the interaction of the fine windings [1F and RXFA & RXFB]. The coarse element is used to determine absolute position with relatively low resolution and the fine element can be used to increase resolution and hence measurement precision. This is particularly space efficient for rotary designs.

Figure 3:
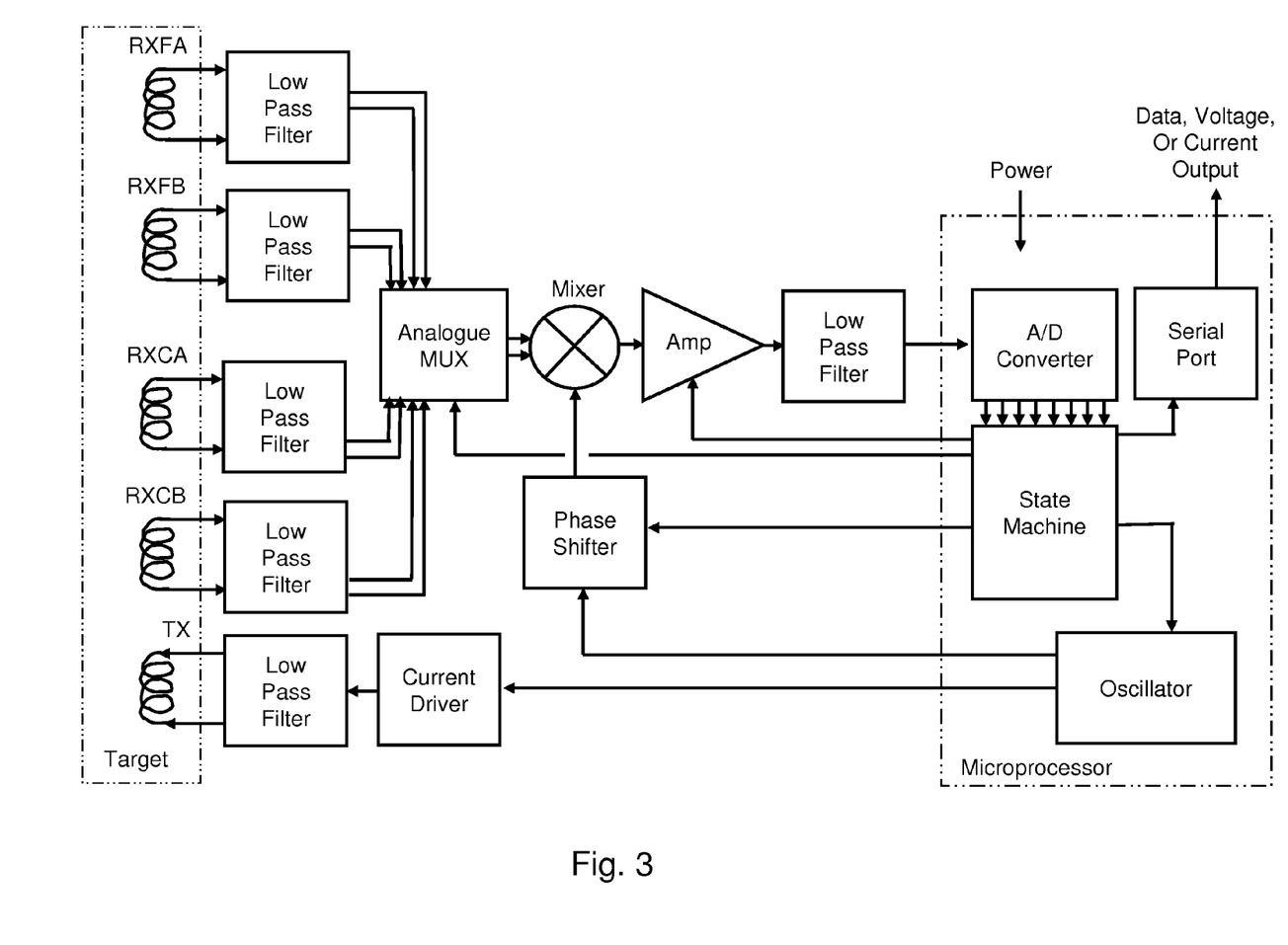
FIG. 3 shows a schematic of the detector's electronic circuit.

FIG. 3 shows a schematic of the electronic circuit [3] which is largely self explanatory. Since the signal in the first fine pitch receive winding [RXFA] is proportional to sin(x) and the signal in the second fine pitch receive winding [RXFB] is proportional to cos(x), then position 'x' within each fine pitch distance [F] can be obtained from the equation (F/2pi) *ARCTAN(RXFA/RXFB). A similar method can be used for the coarse position measurement.

The power supply should pass through an over voltage protection circuit if voltage spikes are possible from the electrical supply. Reverse polarity protection is also a common requirement. Typical power requirements are 5V at 10 milliamps at a 100% duty cycle. The output signal may be produced in a variety of formats such as 0-5V, 4 . . . 20 mA or, preferably, a serial data stream such as SPI so that no errors are introduced as a result of digital to analogue conversion. Preferably, the circuit [3] is constructed from an application specific integrated circuit. Advantageously, the electronic circuit [3] includes a memory so that calibration or other data may be stored. Advantageously, such calibration data should be generated by a higher accuracy (and more expensive) reference detector, such as a laser system, whose readings may then be used to improve the linearity, for example, of the detector's measurements. Depending on the accuracy requirements, each individual detector or each type of detector is calibrated.

MODIFICATIONS AND FURTHER EMBODIMENTS

Figure 4:
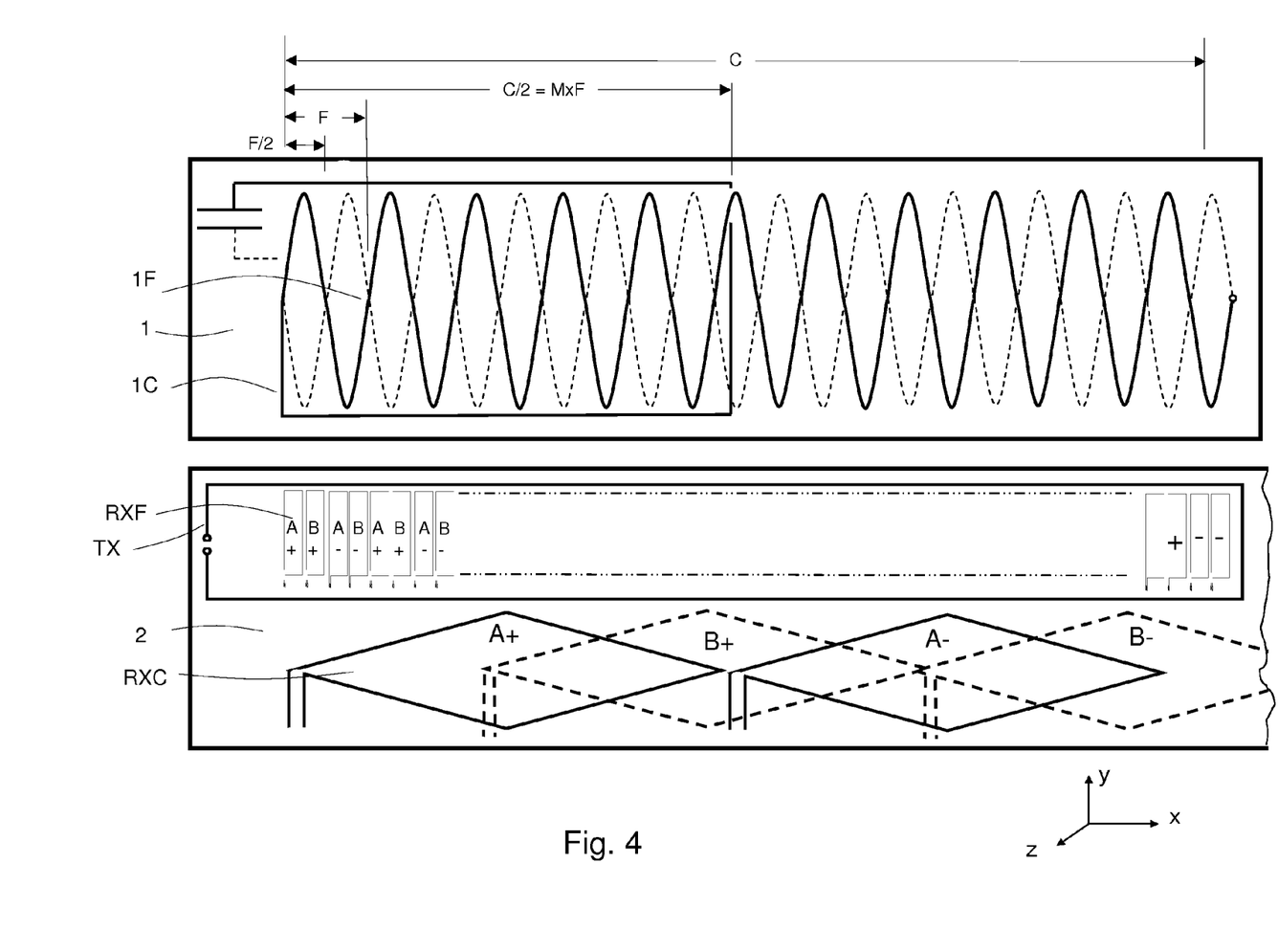
FIG. 4 shows a schematic arrangement of the windings in a second embodiment.

FIG. 4 shows a second embodiment of the invention. For clarity, a linear arrangement of the windings is shown with the target [1] out of position to enable comparison with the first embodiment. The fundamental principle of operation is the same as the first embodiment namely, measuring displacement by measuring mutual inductance between transmit and receive windings. In this embodiment the layout of the windings is the main difference. The target [1] is a passive circuit made from a capacitor in series with an inductor, formed by a laminar winding which has 2 portions [1F & 1C]. The first portion [1F] forms a repetitive fine pitch pattern made from a series of loops of alternating magnetic polarity. The second portion [1C] forms a loop extending along the length of the target and encompassing some of the target's fine windings [1F]. The fine pitch pattern [1F] co-operates with a set of fine pitch receive windings [RXF] and a transmit winding [TX]. The second portion [1C] co-operates with a set of coarse pitch receive windings [RXC] and the transmit winding [TX]. As with the first embodiment, the coarse windings indicate absolute position with relatively low resolution and the fine pitch windings enable higher resolution, but ambiguous, measurement. The coarse receive windings [RXC] may be placed below the fine receive windings [RXF] on a different PCB layer because the target winding's first portion [1C] does not couple to the fine receive winding [RXF]. When the readings are combined in the electronic circuit [3], the readings measure the absolute position of the target [1] relative to the antenna [2] along the measurement axis [x] with high resolution and hence high precision. Various forms of receive winding are possible including sinusoidal, triangular, rectangular etc.

Figure 5:
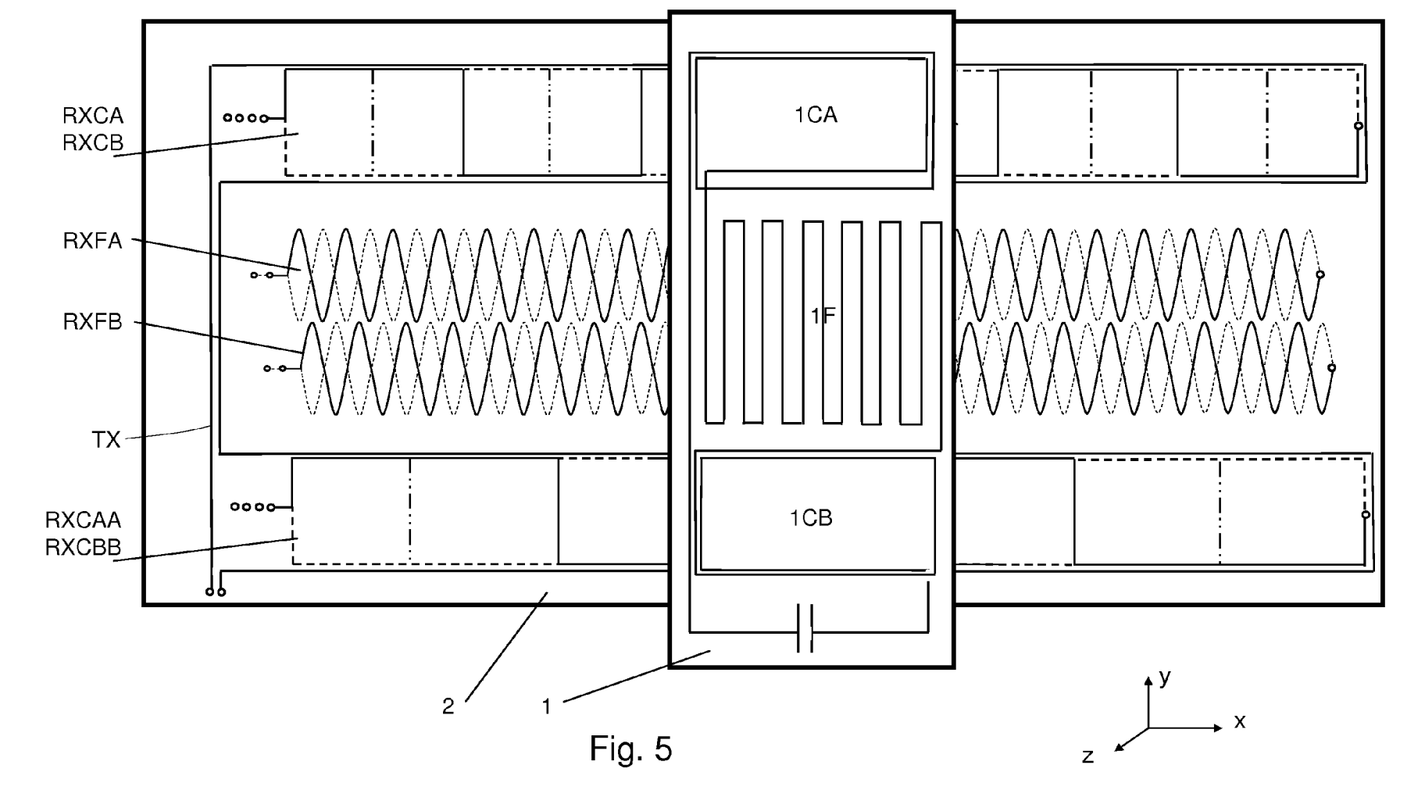
FIG. 5 shows a schematic arrangement of the windings in a third embodiment.

FIG. 5 shows a third embodiment of the invention. For clarity, a linear arrangement of the windings is shown to enable comparison with the first embodiment but in this instance the elements are shown in true functional orientation. The fundamental principle of operation, is the same as the first and second embodiments, however, the arrangement of the windings and details of electronic operation differ. In this embodiment, the target [1] is a passive circuit comprising a capacitor in series with an inductor. The inductor is formed by a laminar winding in 3 portions. The first coarse pitch portion [1CA] co-operates with the first lobe of the transmit winding [TX] and a first pair of coarse receive windings [RXCA & RXCB]. Each coarse winding comprises a series of loops of alternating magnetic polarity. The first pair of coarse windings [RXCA & RXCB] are arranged on top of each other but electrically isolated from each other by using via holes and different layers of the printed circuit board. The first pair of coarse windings [RXCA & RXCB] are shifted by ¼ of their winding pitch so that effectively they form a sinusoidal and cosinusoidal winding. The second portion of the target winding [1F] has a fine pitch and co-operates with a pair of fine receive windings [RXFA & RXFB]. Unlike the coarse receive windings [RXCA, RXCB, RXCAA & RXCBB] the fine pair of windings is arranged side by side rather than on top of each other. Practical implementation using printed circuit board shows that such an arrangement minimizes the required number of layers; minimizes cost; permits a smaller gap between target [1] and antenna [2] and so finer pitch arrangements. The fine pair of windings are shifted by ¼ of their winding pitch. The second coarse pitch portion [1CA] of the target [1] winding co-operates with the second counter wound lobe of the transmit winding [TX] and a second pair of coarse receive windings [RXCAA & RXCBB]. The pitch of the second pair of coarse windings is chosen as a Vernier multiple of the first coarse receive windings. For clarity, FIG. 5 shows a simple arrangement: the first pair is shown with 2 pitches, the second pair with 3 pitches. This arrangement offers a further increase or gearing in measurement performance from the Vernier arrangement of the coarse windings as well as the relationship between the coarse and the fine windings. The multi-lobe arrangement of the transmit [TX] and target windings [1CA & 1CB] improves electromagnetic compatibility (EMC) performance and has further advantages in reducing the effects of displacement of the target [1] in axes other than the measurement axis.

Figure 6:
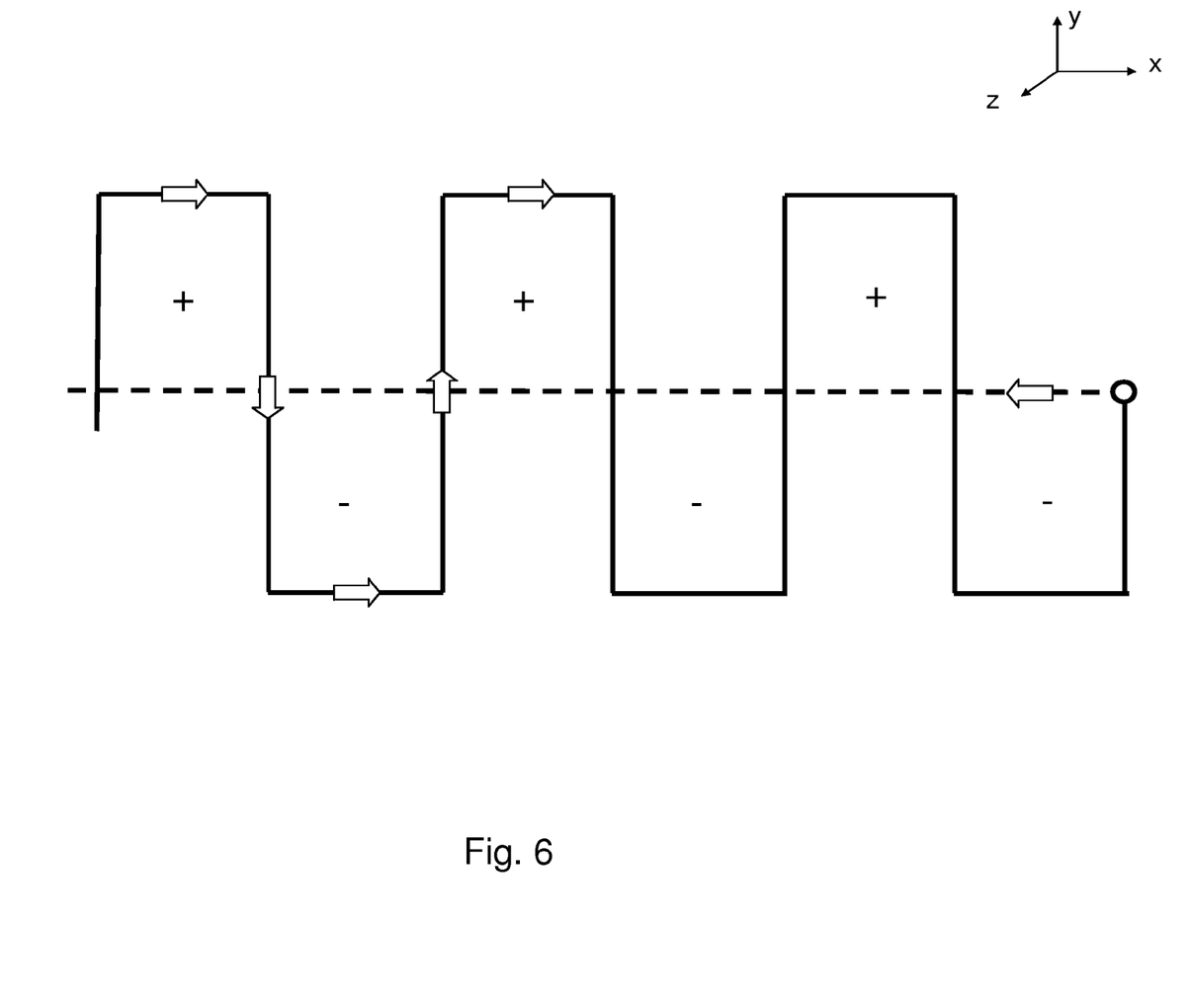
FIG. 6 shows a winding arrangement which eradicates errors due to positional variation between layers of printed circuit boards.

Arranging the receive windings side by side minimizes the number of via holes and allows very fine pitch windings to be constructed and hence very high precision measurement. At such levels of resolution, the manufacturing tolerances of printed circuit board manufacture begin to effect measurement accuracy. In particular, the alignment of one layer of conductors with the other can cause variation between individual constructions. To avoid this, an alternative winding arrangement can be used as shown in FIG. 6. For clarity in FIG. 6, the spacing of the conductors has been expanded in the x-axis. In reality, the conductors running up and down the y-axis would be much more closely packed. In this arrangement, a series of loops with alternating magnetic polarity are formed using a first serpentine conductor on one layer and a second conductor on another layer whose exact position or alignment has substantially no influence on the pitch accuracy of the windings. Advantageously, a second conductor which runs straight along the measurement axis is used.

For reasons of clarity, only linear forms of the detector have been described so far, however, the detector can be arranged in a wide variety of geometries including rotary, curvilinear, 2D etc. as well as measurement paths made up from complex curves or surfaces.

The invention is not restricted by a particular number or arrangement of windings and various permutations of number, spacing and arrangement are feasible. For example, it is not necessary for the antenna [2] to have co-planar or co-located transmit and receive windings. Transmit and receive windings may, for example, be placed on either side of the target and act as a mechanical guide.

Multiple targets [1] and multiple antennae [2] may be constructed on the same physical piece of PCB by isolating the various systems. Multi-layer PCB is particularly useful in this regard. Such constructions are advantageous in safety related detectors where electrical redundancy is necessary. In an electrically redundant system a multiplicity of targets [1] of varying frequencies may be concurrently detected using a multiplicity of antennae [2] energised with the relevant frequencies, each antenna [2] being controlled by its own electronic circuit [3].

When high levels of safety, availability or reliability are needed, then detectors with self checking hardware and software may be made. Not only can the electronic circuit [3] carry out the traditional methods for checking for open circuits, out of bounds measurements etc. but a second, stationary target can be fixed relative to the antenna [2]. In this way a self diagnostic check can be carried out by measuring the position of the fixed target. If the fixed target appears to have moved past predefined limits then this indicates a fault and an alarm or corrective action generated.

To maximise received signal strength and so maximise the signal:noise ratio, the electronics circuit [3] should preferably include a frequency tuning circuit so that the transmit frequency can be tuned to the exact frequency of the target [1].

Preferably, any material between the target [1] and antenna [2] is an insulator. A metal barrier can be placed between them so long as the excitation and resonant frequency is low enough to allow the signals to carry through the metal's skin depth. If a metal barrier is essential, then preferably the metal has a relatively low conductivity or magnetic permeability such as non-magnetic stainless steel (e.g. 316 grade stainless). A frequency of 40 kHz is, for example, sufficient to permit the transmission of signals through 2 mm thick, non-magnetic stainless steel.

For most applications the effect of extreme or changing temperatures will have negligible effect on measurement performance. In some applications, however, very high accuracy measurement is needed although the temperature range or variation may be extreme. In such instances, the relatively small expansion or contraction of the antenna [1] or target [2] may lead to inaccurate measurement. Temperature effects may be compensated by measuring the actual operating temperature and modifying the measured position accordingly, i.e. reducing or increasing the measured value according to the temperature. Temperature can be measured using a thermocouple or resistance device but preferably the resistance of one or more of the antenna windings can be used to provide an indication of temperature. The position and extent of these windings provide a highly representative measurement compared to measurement at a single point as might be obtained with a thermocouple, for example.

The invention claimed is:

1. An inductive position detector comprising an antenna device and a target device, wherein:
   the antenna device comprises a plurality of antenna windings,
   the target device comprises a passive resonant circuit formed by a target winding in series with a capacitor;
   one of the antenna and target devices defines a measurement path and the antenna and target devices are arranged for relative movement along the measurement path;
   the antenna device is configured to induce an alternating current in the passive resonant circuit, in use, such that the induced alternating current in the passive resonant circuit induces an alternating signal in the antenna windings by virtue of the mutual inductance of the antenna windings and the passive resonant circuit, which signals are indicative of the relative position of the devices along the measurement path;
   the target winding comprises a first portion and a second portion in series with the first portion and the antenna windings comprise a first antenna winding arranged to interact with the first portion of the target winding and a second antenna winding arranged to interact with the second portion of the target winding;
   at least one of the first portion of the target winding and the first antenna winding is configured such that the distance of the winding to the measurement path in the direction transverse to the measurement path varies with distance along the measurement path according to a first predefined relationship such that the mutual inductance of the first portion of the antenna winding and the first target winding is a function of the relative position of the devices on the measurement path;
   at least one of the second portion of the target winding and the second antenna winding is configured such that the distance of the winding to the measurement path in the direction transverse to the measurement path varies with distance along the measurement path according to a second predefined relationship such that the mutual inductance of the second portion of the target winding and the second antenna winding is a function of the relative position of the device on the measurement path; and
   the rate of variation of the transverse distance of the winding to the measurement path with distance along the measurement path is greater according to the first predefined relationship than according to the second predefined relationship.

2. An inductive position detector as claimed in claim 1, wherein the first predefined relationship is a periodic relationship.

3. An inductive position detector as claimed in claim 2, wherein the first portion of the target winding comprises a plurality of periods according to the periodic relationship.

4. An inductive position detector as claimed in claim 2, wherein the second predefined relationship is a periodic relationship.

5. An inductive position detector as claimed in claim 4, wherein the first predefined relationship has a higher spatial frequency than the second predefined relationship.

6. An inductive position detector as claimed in claim 2, wherein the periodic relationship is selected from the group consisting of sinusoidal, triangular wave, square wave and polygonal wave.

7. An inductive position detector as claimed in claim 1, wherein the antenna windings comprise a pair of first antenna windings arranged to interact with at least one of the first portion of the target windings and/or a pair of second antenna windings arranged to interact with the second portion of the target winding.

8. An inductive position detector as claimed in claim 7, wherein the two first windings of each pair are displaced relative to each other in the direction of the measurement path by one quarter of a period.

9. An inductive position detector as claimed in claim 7, wherein the antenna windings of at least one of the pairs of antenna windings are mutually superposed.

10. An inductive position detector as claimed in claim 7, wherein the first windings of at least one of the pairs of first windings are mutually interleaved.

11. An inductive position detector as claimed claim 1, wherein at least one of the first antenna winding(s) and/or the second antenna winding(s) is a receive windings.

12. An inductive position detector as claimed in claim 11, wherein the antenna windings further comprise a transmit winding.

13. An inductive position detector as claimed in claim 1, wherein at least one of the first detector winding(s) and/or the second antenna winding(s) is a transmit windings.

14. An inductive position detector as claimed in claim 13, wherein the antenna windings further comprise a receive winding.

15. An inductive position detector as claimed in claim 1, wherein the first antenna winding is spaced from the second antenna winding in a direction transverse to the direction of the measurement path.

16. An inductive position detector as claimed in claim 1, wherein the first portion of the target winding is spaced from the second portion of the target winding in a direction transverse to the direction of the measurement path.

17. An inductive position detector as claimed in claim 16, wherein the first portion of the target winding is superposed on the second portion of the target winding.

18. An inductive position detector as claimed in claim 1, wherein both the first portion of the target winding and the first antenna winding(s) is configured such that the distance of the winding to the measurement path in the direction transverse to the measurement path varies periodically with distance along the measurement path.

* * * * *